T. J. POWERS, dec'd.
ANNA POWERS, Extr'x
Paper-Box.
No. 6,618. Reissued Aug. 24, 1875.
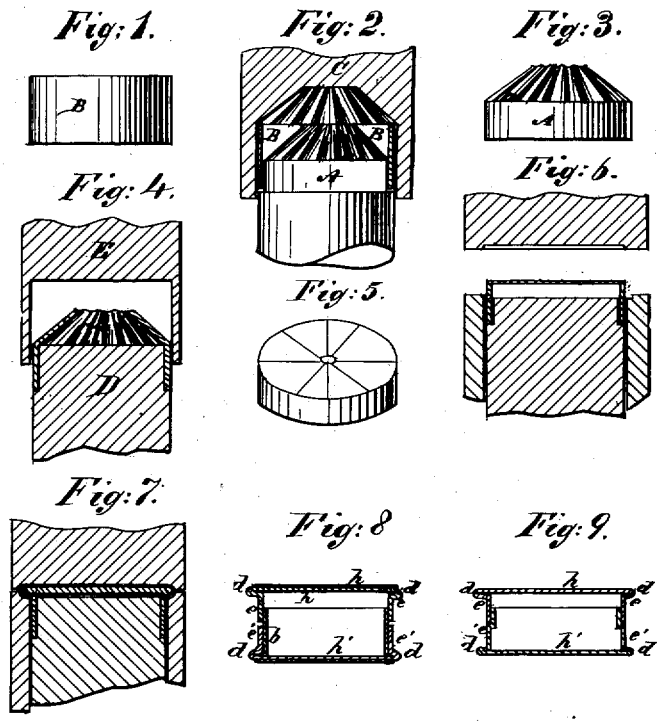
Witnesses:
Henry Eichling.
B. S. Clark.
Inventor.
Anna Powers,
Executrix of Estate of T. J. Powers deceased
By J. P. Reed
her Attorney.

BEST AVAILABLE COPY

UNITED STATES PATENT OFFICE.

Specification forming part of Letters Patent No. 156,591, dated November 3, 1874; reissue No. 6,618, dated August 24, 1875; application filed July 22, 1875.

*To all whom it may concern:*

Be it known that TIMOTHY J. POWERS, deceased, late of the city of New York, county and State of New York, invented a Paper Box, the same being a new manufacture, of which the following is a specification:

This invention relates to pasteboard boxes; and consists in a box the body of which is formed of a cylinder of paper, one end of which, to form the bottom, is folded inward, and pressed without being cut, and covered with a disk of paper.

In the accompanying drawings there are shown both a box embodying this invention and the tools by which the same is made.

The method of fabricating this new box which has been found most convenient is to take common paper, cover one side thinly with paste, and form it into a tube or cylinder having walls of sufficient thickness by winding it around a mandrel of suitable size, corresponding to the diameter of the box designed to be made. A side elevation of such a cylinder is seen at Figure 1. This cylinder is then placed upon a die (shown in elevation at A, Fig. 2) having a shoulder to support the lower edge of the cylinder, (shown in section,) and the upper end, above the line *a*, being made conical, and grooved or fluted to match the die A, fits down over the latter. It is evident that when the die C is pressed down upon the paper cylinder its upper portion above the line *a* will be folded inward, and made to assume the form represented by Fig. 3. It is then transferred to another die, D, with a plane surface at the upper end, and also a shoulder to support the paper cylinder, as shown in section in Fig. 4. By pressing the upper plane-faced die E down upon the lower die D the folding process will be completed; and, a severe pressure being applied, a smooth plane top will be formed, as shown in Fig. 5. Then, by pasting a disk of paper, *h'*, over the face of the closed end, both inside the box and out, the folds and the aperture that may be left at the center will be entirely closed. This constitutes one part, top or bottom, as the case may be, of the intended box. A similar closed cylinder may be made for the other part of the box. The process or method of forming a projecting rim or flange, *d*, around the top and bottom of the box (shown in Figs. 8 and 9) is a well-known one, as practiced in forming the flange-headed metallic cartridge-cases. The tools by which it may be performed are shown in Figs. 6 and 7, in the latter the said flange being represented as completed. Fig. 8 shows, in section, the completed box, a supplemental cylinder, *b*, being inserted in the usual way, to form a neck for the cover. In place of using this supplemental cylinder, a neck may be formed on the base or bottom portion of the box, as represented in Fig. 9. The process and tools by which this neck may be formed do not differ from those usually employed in reducing the ends of metal tubes, as, for example, metallic cartridge-cases.

In folding down the wall of the cylinder to form the bottom or top, as above specified, it is recommended that the folds be carried inward, so that, after being subjected to pressure, whatever uneveness there is shall be on the inside of the box, leaving the outer surface smooth and plane. This result may be accomplished by a suitable construction of the folding-dies, the corrugations or spines on the face of the dies being made thin and short, and sufficiently prominent for the purpose.

In making paper cartridge cases and shells, the end of the tube has been swaged or turned inward, and the end closed, and the head of the cartridge formed by a mass of paper pressed into it, as set forth in the patent to T. J. Powers, May 17, 1870, No. 103,079. The box thus formed may be labeled or ornamented as desired.

A mode of proceeding and tools whereby the box which is the subject of the present invention may be fabricated are above described; but any other may be employed for the purpose which the manufacturer may find to be convenient.

It is not intended to make any claim here for the process or tools, as such, herein described, reserving for a separate application whatever patentable inventions there may be in such process and tools.

What is claimed as the invention of TIMOTHY J. POWERS, and for which Letters Patent are desired, is—

As a new manufacture, a paper box the body or cover of which is composed of a hollow cylinder, one end of which, to form the bottom or top, is folded inward and pressed without being cut, and covered with a disk of paper, as described.

ANNA POWERS,
*Executrix of the estate of T. J. Powers, deceased.*

In presence of—
A. S. FITCH,
B. S. CLARK.